(12) United States Patent
Hiramatsu (10) Patent No.: US 6,498,928 B1
(45) Date of Patent: Dec. 24, 2002

(54) RADIO RECEPTION APPARATUS AND METHOD FOR DETECTING RECEPTION TIMING

(75) Inventor: Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/720,355

(22) PCT Filed: Apr. 18, 2000

(86) PCT No.: PCT/JP00/02499
§ 371 (c)(1),
(2), (4) Date: Dec. 22, 2000

(87) PCT Pub. No.: WO00/65750
PCT Pub. Date: Nov. 2, 2000

(30) Foreign Application Priority Data

Apr. 23, 1999 (JP) .............................. 11-115765

(51) Int. Cl.[7] .............................................. H04B 1/06
(52) U.S. Cl. ................................ 455/278.1; 455/277.1; 455/277.2; 455/561
(58) Field of Search ................................ 455/422, 561, 455/562, 133, 303, 304, 231, 226.1, 242.1, 242.2, 279.1, 563, 82, 277.1, 277.2, 278.1, 267

(56) References Cited

U.S. PATENT DOCUMENTS

| | | | | |
|---|---|---|---|---|
| 5,566,355 A | * | 10/1996 | Kanai | 445/25 |
| 5,966,670 A | * | 10/1999 | Keskitalo | 455/562 |
| 6,091,788 A | * | 7/2000 | Keskitalo | 375/347 |
| 6,320,853 B1 | * | 11/2001 | Wong | 370/328 |

FOREIGN PATENT DOCUMENTS

| | | |
|---|---|---|
| EP | 0852407 | 7/1998 |
| JP | 1051221 | 2/1998 |
| JP | 10200429 | 7/1998 |
| JP | 10256821 | 9/1998 |
| JP | 2000059278 | 2/2000 |
| JP | 2000134023 | 5/2000 |
| JP | 2000165321 | 6/2000 |

OTHER PUBLICATIONS

PCT International Search Report dated Jul. 25, 2000.

* cited by examiner

Primary Examiner—Vivian Chin
Assistant Examiner—John J Lee
(74) Attorney, Agent, or Firm—Stevens, Davis, Miller & Mosher, LLP (57) ABSTRACT

A radio reception apparatus receives signals from all directions through a plurality of directivities, and generates a delay profile to each directivity. The apparatus selects a path having the largest received signal among a plurality of delay profiles generated by suppressing interference signals after thus narrowing down directions.

10 Claims, 6 Drawing Sheets

RADIO RECEPTION APPARATUS AND METHOD FOR DETECTING RECEPTION TIMING

TECHNICAL FIELD

The present invention relates to a radio reception apparatus and a method for detecting reception timing, both being used in a digital radio communication system.

BACKGROUND ART

A propagation path in a digital radio communication system has a frequency characteristic as a transmission path, and then the propagation path has a transmission characteristic having selectivity to frequencies, since the propagation path is generally composed of multipath. Moreover, these characteristics vary with time as a communication terminal such as a mobile station moves, and a received signal consequently has fading different in its frequency band. The fading is called as selective fading.

As a measure against the selective fading, there is an adaptive array technique. The adaptive array technique is a technique in which a plurality of antenna elements are prepared and signals received by these antenna elements are weighted to be combined.

Figure 1:
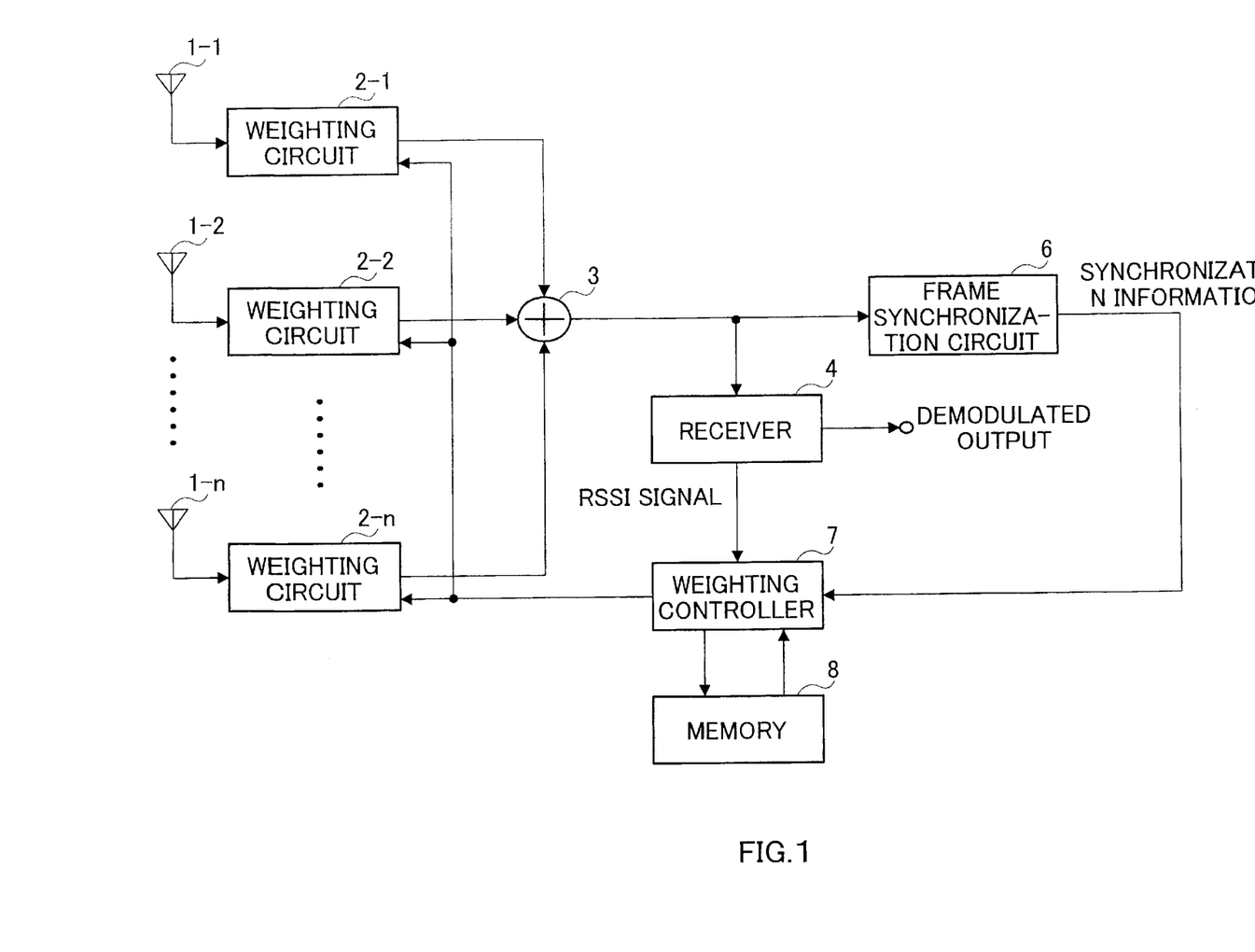
FIG. 1 is a block diagram showing the configuration of a conventional radio reception apparatus.

In such an adaptive array technique, reception timing is detected for receiving a desired signal correctly. An adaptive array antenna device having a reception timing detection function as a conventional radio reception apparatus is disclosed in Japanese laid-open patent publication HEI 10-51221. FIG. 1 is a block diagram showing the schematic configuration of the adaptive array antenna device.

The adaptive array antenna device outputs signals received by antennas 1-1 to 1-n to weighting circuits 2-1 to 2-n, respectively. The weighting circuits 2-1 to 2-n weight each of the signals for controlling directivity, and output the weighted signals to a combining circuit 3 for combining the weighed signals.

The combined signal is output to a receiver 4 and a frame synchronization circuit 6. The receiver 4 demodulates the combined signal to output a demodulated output. Moreover, the receiver 4 detects the received signal strength indicator (RSSI) of the combined signal to output the detected result (RSSI signal) to a weighting controller 7.

Furthermore, the frame synchronization circuit 6 maintains the synchronization on the basis of the combined signal, and outputs the synchronization timing to the weighting controller 7. The weighting controller 7 controls respective weighting coefficients for outputting them to the weighting circuits 2-1 to 2-n so as to maintain the timing that the RSSI signal takes its maximum. The weighting coefficients are fittingly stored in a memory 8.

Figure 2:
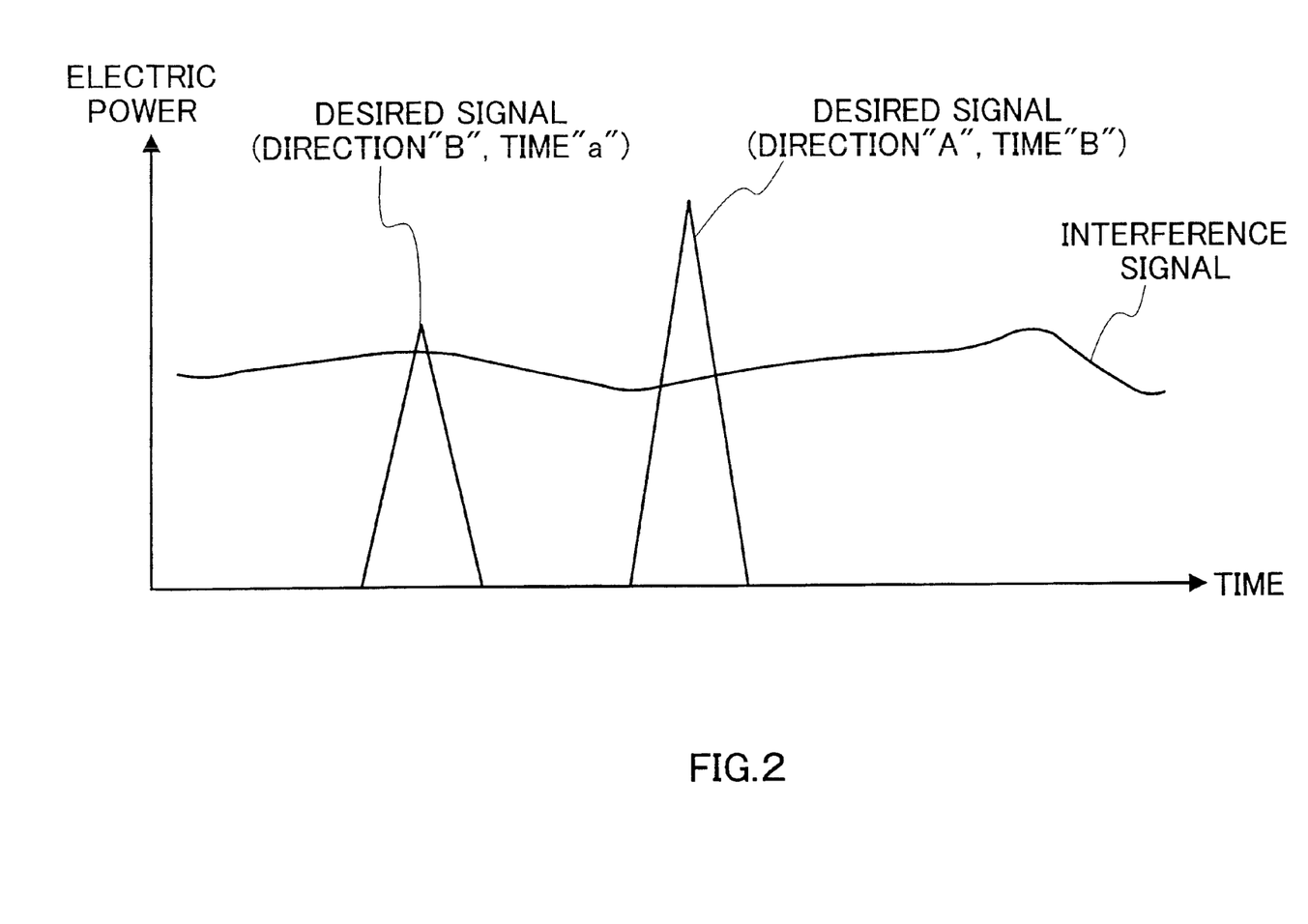
FIG. 2 is a drawing showing a delay profile generated in the conventional radio reception apparatus.

However, in the conventional adaptive array antenna device, a delay profile shown in FIG. 2 is generated. That is, if the device receives signals without isolating directivities in the case where a desired station and an interference station exist, signals from the desired station are received at the times "a" and "b". The signal at the time "a" is a signal that arrives the device directly from a direction "B". The signal at the time "b" is a signal that arrives the device from a direction "A" after being reflected by a far reflecting object such as a mountain. (See FIG. 5 about the directions "A" and "B".) Consequently, the signal at the time "b" arrives the device later than the signal at the time "a". In this case, because signals from directions except for the direction of the desired station all become interference signals, there exist many interference signals in the case where the directivity is not isolated. When many interference signals exist, it becomes difficult to detect reception timing correctly.

Moreover, in the case where the directivity is not isolated, signals arrived from directions other than the directivity formed by the weighting circuits 2-1 to 2-n cannot be received. Furthermore, at the time of turning on its power or in case of detecting signals received from all directions, the weighting control takes very long time.

DISCLOSURE OF INVENTION

An object of the present invention is to provide a radio reception apparatus and a reception timing detection circuit, both capable of detecting the reception timing precisely at the time of detecting signals received from all directions such as a time when its power supply is turned on, and besides at the time of receiving a signal arrived from a direction different from a currently receiving direction during performing communication.

The inventor of the present invention paid attention to the fact that all the signals from directions except for the direction, to which the directivity was generated, became interference signals when directivity reception was performed, and the fact that the interference signals made the precise detection of the reception timing difficult. And the inventor found that the interference amount in each directivity could be decreased by dispersing the interference signals by providing a plurality of fixed directivities. Consequently, those facts led the present invention.

That is, the subject matter of the present invention is to narrow down directions from which interference signals reach by means of delay profiles generated for each fixed directivity to suppress the interference amount of the interference signals for performing the detection of reception timing or the selection of a path.

BEST MODE FOR CARRYING OUT THE INVENTION

Hereafter, an embodiment of the present invention will be described in detail with reference to the attached drawings.

(Embodiment 1)

Figure 3:
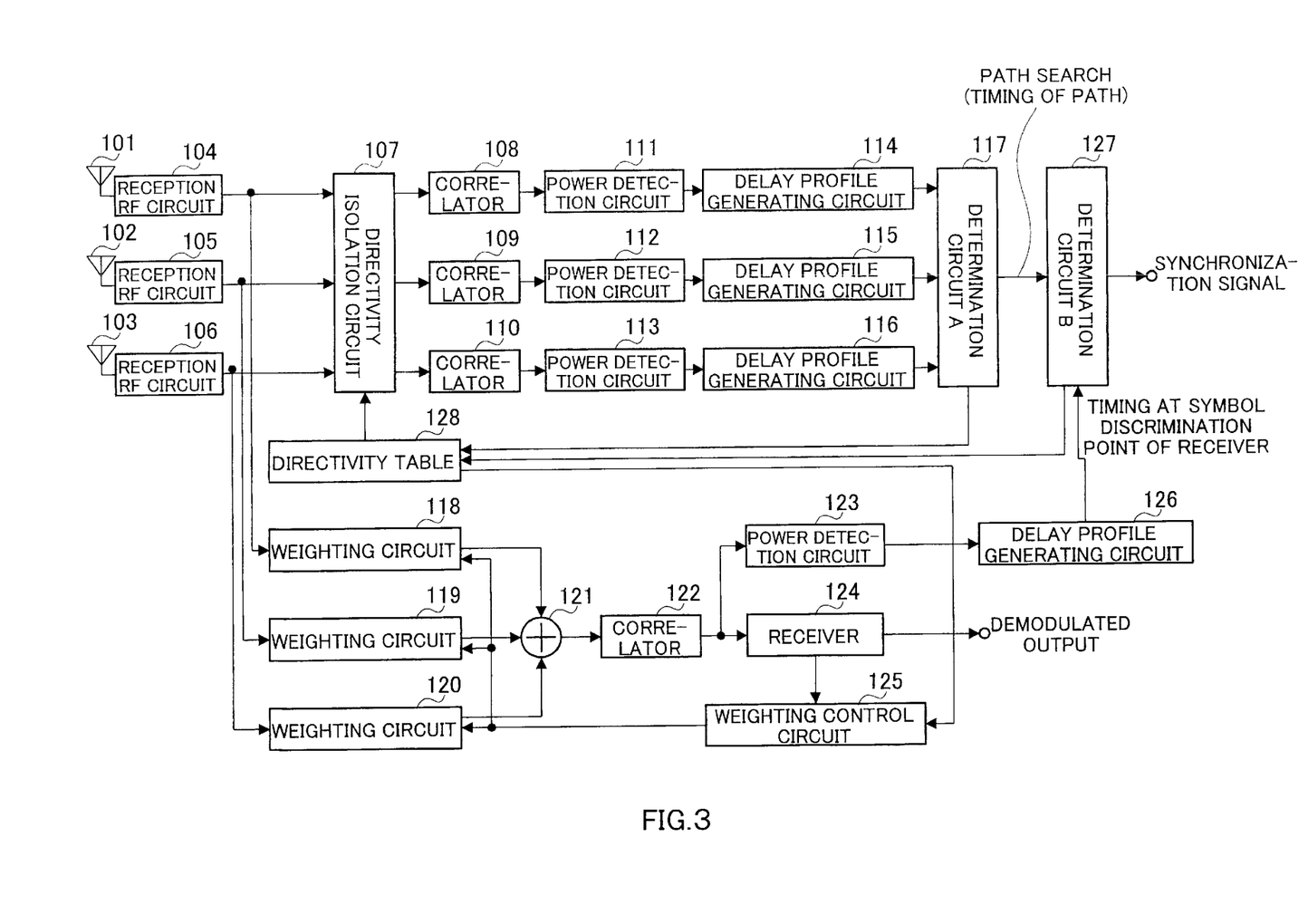
FIG. 3 is a block diagram showing the configuration of a radio reception apparatus according to an embodiment of the present invention.

FIG. 3 is a block diagram showing the configuration of an adaptive array antenna device as a radio reception apparatus according to an embodiment of the present invention.

In the adaptive array antenna device, signals are received by reception RF circuits 104–106 through antennas 101–103. The reception RF circuits 104–106 amplify the received signals and convert them to low frequency signals. The thus obtained IF signals, or base band signals, are output to a directivity isolation circuit 107, and are isolated by every directivity. The signals isolated by every directivity are output to correlators 108–110, respectively. Incidentally, the operation of the directivity isolation circuit 107 will be described later.

The correlators 108–110 operate the correlations between the received signals and known signals. For example, in case of a CDMA communication system, the correlators 108–110 perform despreading processing to the received signals with a spreading code and a scrambling code. In case of a TDMA communication system, the correlators 108–110 operates the correlations between known signals included in the received signals and known signals on the device side. In any cases, by performing correlation operations between the received signals and the known signals on the device side in advance, signals of a broadcasting station with which communication is desired can be extracted.

The correlated outputs from the correlators 108–110 are output to power detection circuits 111–113, and their power is detected there. The detection results are output to delay profile generating circuits 114–116, and delay profiles are generated by every directivity there. The delay profile information is output to a determination circuit A 117, and the determination circuit A 117 determines the timing of a peak at which the reception power is largest among respective delay profiles as the reception timing. Incidentally, the generating of the delay profiles will be described later.

On the other hand, the signals received by the reception RF circuits 104–106 are output to weighting circuits 118–120, respectively. The weighting circuits 118–120 multiply these inputted signals by a weighting coefficient to output the products of the multiplications to a combining circuit 121. The combining circuit 121 combines the output products to a combined signal. The combined signal is output to a correlator 122, and the correlation operation between the combined signal and the known signal on the device side is performed by the correlator 122, as described above. The correlation operation result is output to a power detection circuit 123 and a receiver 124.

The power detection circuit 123 detects the power of the combined signal. The detection result is output to a delay profile generating circuit 126. The delay profile generating circuit 126 generates the delay profile of the detection result. The delay profile information is output to a determination circuit B 127, and the determination circuit B 127 determines the timing of a peak at which the reception power is largest among respective delay profiles as the reception timing. And then, the determined timing is outputted as a synchronization signal.

Incidentally, the determination results of the determination circuit A 117 and the determination circuit B 127 are output to a directivity table 128. The directivity table 128 stores prescribed directivity patterns, and the directivity table 128 outputs a prescribed directivity pattern to the directivity isolation circuit 107 on the basis of the determination results.

The receiver 124 demodulates the synchronized signals to output the demodulated signals. Moreover, the outputs from the receiver 124 are output to a weighting control circuit 125. The weighting control circuit 125 controls the weighting coefficients of the weighting circuits 118–120 so that the received signals are correctly received by means of an LMS algorithm or a CMA algorithm.

Next, the operation of the adaptive array antenna device having the aforesaid configuration will be described. At first, there will be given a description to a case of receiving a signal arrived from a direction other than the directivity pattern formed by the weighting circuits 118–120.

Signals received by the reception RF circuits 104–106 through the antennas 101–103 are amplified, and their frequencies are converted by the reception RF circuits 104–106. After that, the converted signals are output to the directivity isolation circuit 107. The directivity isolation circuit 107 isolates the output signals by every directivity.

As a method of isolating the directivity, there are methods such as a method that performs the isolation by a fast Fourier transformation (FFT) operation of the frequency-converted signals, a method that performs the isolation by multiplying the frequency-converted signals by weighting coefficients on the basis of respective directivities, and the like. In this embodiment, a description will be given to the method that performs the isolation by multiplying the frequency-converted signals by weighting coefficients on the basis of the respective directivities as an example.

Figure 4:
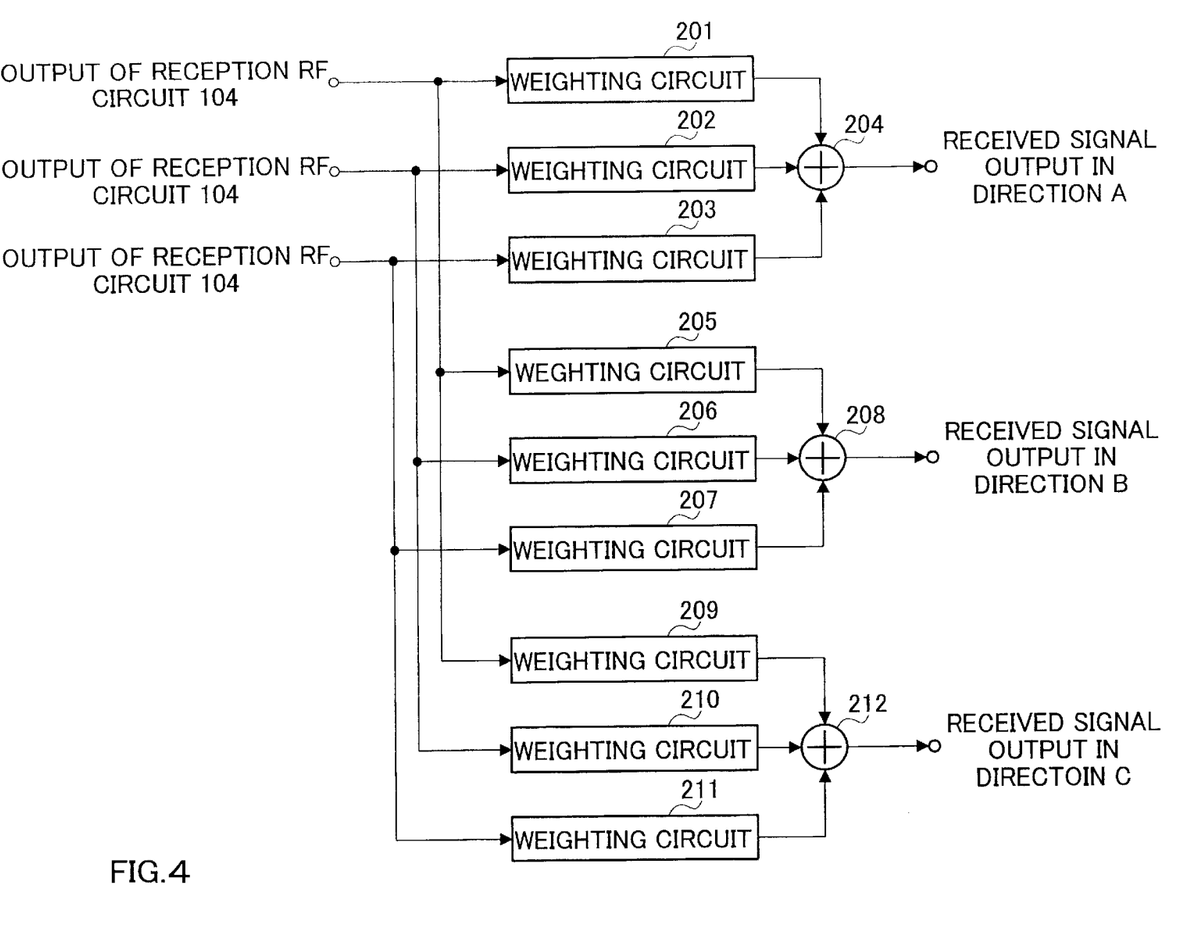
FIG. 4 is a block diagram showing the configuration of the directivity isolation circuit of the radio reception apparatus of the embodiment.

The directivity isolation circuit 107 has a configuration as shown in FIG. 4. As shown in the FIG. 4, the output of the reception RF circuit 104 is output to the weighting circuits 201, 205 and 209. Moreover, the output of the reception RF circuit 105 is output to the weighting circuits 202, 206 and 210. Furthermore, the output of the reception RF circuit 106 is output to the weighting circuits 203, 207 and 211.

The weighting circuits 201–203 multiply signals received by the antennas 101–103 by a weighting coefficient of an arriving direction A (see FIG. 5), respectively; the weighting circuits 205–207 multiply signals received by the antennas 101–103 by a weighting coefficient of an arriving direction B, respectively; and weighting circuits 209–211 multiply signals received by the antennas 101–103 by a weighting coefficient of an arriving direction C, respectively.

The signals weighted by each weighting circuit are added by adders 204, 208 and 212. That is, the adder 204 adds signals that are multiplied by the weighting coefficients by the weighting circuits 201–203, and outputs a received signal in the direction A; the adder 208 adds signals that are multiplied by the weighting coefficients by the weighting circuits 205–207, and outputs a received signal in the direction B; and the adder 212 adds signals that are multiplied by the weighting coefficients by the weighting circuits 209–211, and outputs a received signal in the direction C. The received signals can thus be isolated by each directivity.

The correlators 108–110 perform the correlation operations of those outputs of the received signals by each directivity, and thereby signals transmitted from a desired station are extracted. Then, the power detection circuits 111–113 detect the power of the extracted signals.

Figure 5:
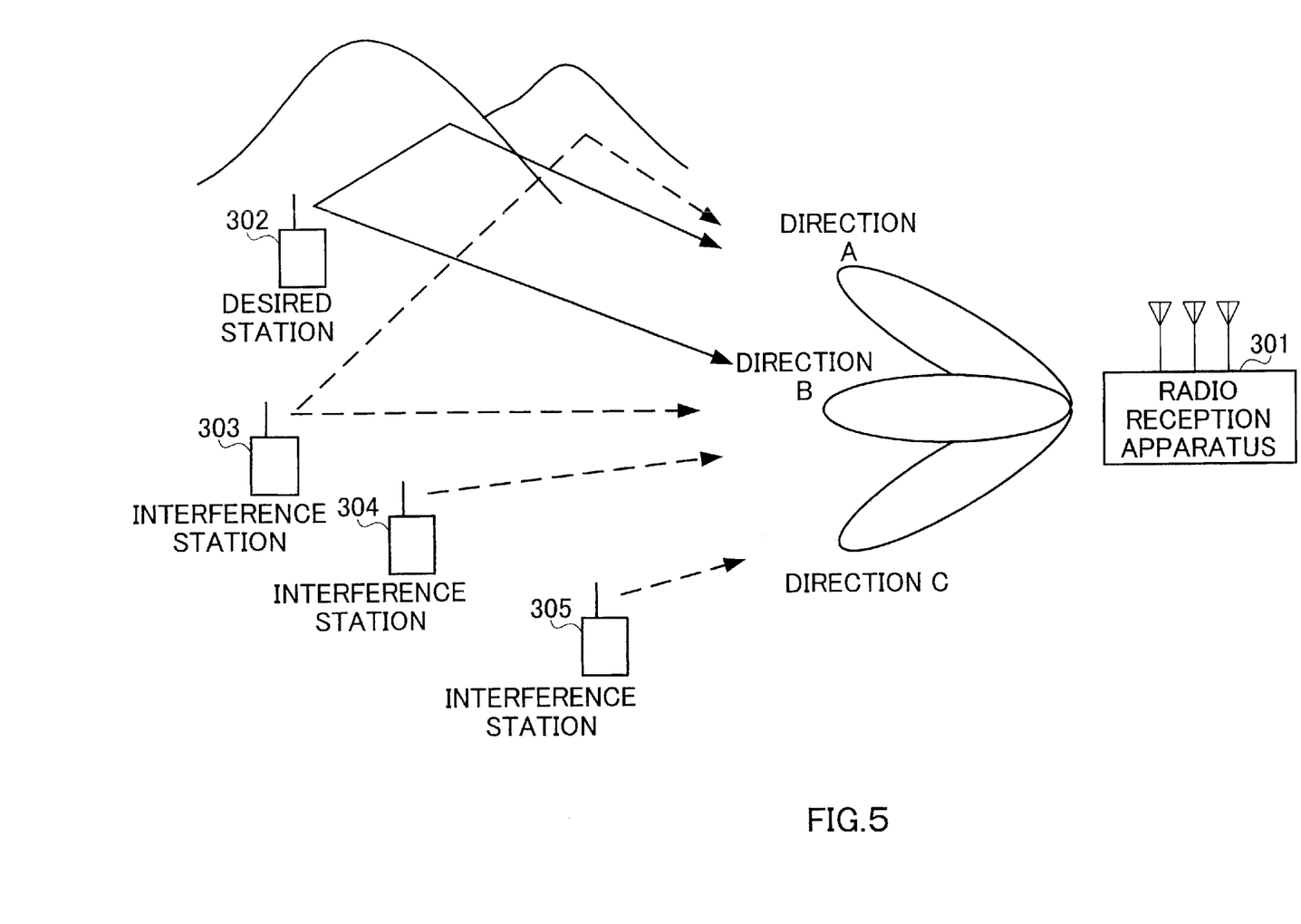
FIG. 5 is a schematic diagram showing a communication system including the radio reception apparatus of the embodiment.
Figure 6A:
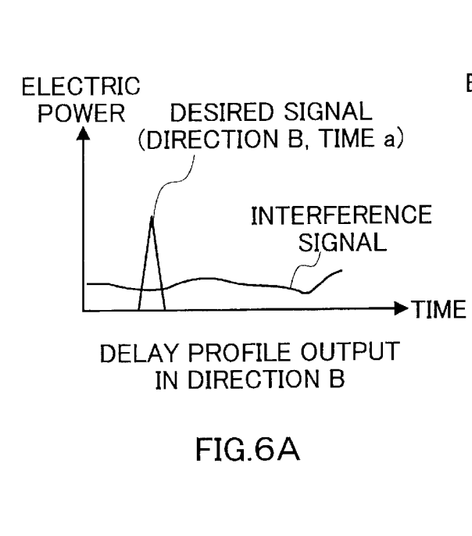
FIG. 6A is a diagram showing a delay profile generated in the radio reception apparatus of the embodiment.
Figure 6B:
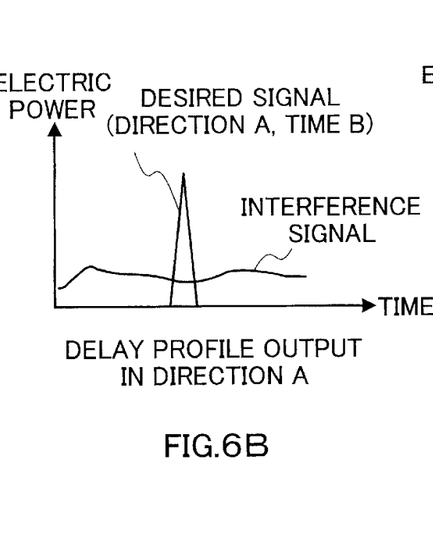
FIG. 6B is a diagram showing another delay profile generated in the radio reception apparatus of the embodiment.

After the power has thus been detected, the delay profile generating circuits 114–116 generate delay profiles by every directivity. As shown in FIG. 5, in the case where the present radio reception apparatus 301 receives signals through a plurality of directivities A–C, the signal from a desired station 302 directly arrives the radio reception apparatus 301 from the direction B, and the signal arrives the radio reception apparatus 301 from the direction A after delay owing to the reflection from a mountain or the like. Consequently, the delay profile in the direction A, as shown in FIG. 6B, has a peak of the signal from the desired station (desired signal) at time "b". The delay profile in the direction B, as shown in FIG. 6A, has a peak of the desired signal at time "a" (b>a).

Figure 6C:
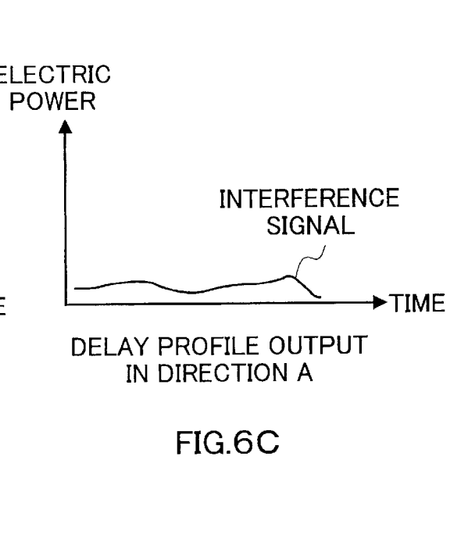
FIG. 6C is a diagram showing a further delay profile generated in the radio reception apparatus of the embodiment.

As known from FIG. 5, the desired signal is received from the direction A and the direction B, but the desired signal is not received from the direction C. That is, from the direction C, only interference signals from interference stations 303–305 are received. In this case, the delay profile becomes one as shown in FIG. 6C.

As known from FIG. 5, because the directivities are isolated, signals received from the interference stations 303–305 are narrowed down to the signal arrived from each arriving direction, respectively. The interference amounts concerning the interference signals are consequently decreased. This fact is apparent from the electric power of the interference signals in the delay profiles shown in FIGS. 6A–6C. In other words, because a delay profile is generated by every directivity, the interference amount (interference power) of an interference signal in the delay profile shown in FIG. 2 is distributed to each directivity, and consequently the interference amount in each delay profile concerning each directivity is decreased.

As a result, in the delay profile, the timing of a signal from a desired station can correctly be detected. That is, the timing of the signal from the desired station can correctly be detected by selecting a path at the time "a" in the direction B from the delay profile shown in FIG. 6A.

As described above, by generating a delay profile by every directivity, directions from which interference signals arrive are narrowed down, and then the interference amount of the interference signals is suppressed to make it possible to detect the reception timing. Accordingly, by setting directivity to all directions (360°) in advance, the timing of received signals concerning all directions can be detected in the state of suppressing the interference signals.

(Embodiment 2)

Next, a description will be given to the operation during the communication of the adaptive array antenna device in the embodiment 1.

The reception timing of a desired signal is detected in the method described above immediately after the power source of the device has been turned on. As described above, in the device of the present invention, a delay profiled is generated by every directivity, and consequently the directions from which interference signals arrive are narrowed down and the interference amounts of the interference signals are suppressed. Thus, the detection of reception timing is performed.

Next, the detected timing (determination result) is output to the directivity table 128. A weighting coefficient corresponding to the directivities elected from the directivity table 128 is output to the weighting control circuit 125. The weighting control circuit 125 controls the weighting circuits 118–120 so that the weighting circuits 118–120 multiply signals received by respective antennas 101–103 by the weighting coefficient. The signals multiplied by the weighting coefficient are combined by the combining circuit 121, and the correlation operation of the combined signal is performed by the correlator 122, namely the signal from the desired station is extracted. After that, the extracted signal is output to the receiver 124.

The receiver 124 demodulates the combined signal to obtain a demodulated signal. The output from the receiver 124 is output to the weighting control circuit 125. The weighting control circuit 125 controls the weighting coefficients of the weighting circuits 118–120 so that the received signals are correctly received by means of an LMS algorithm or a CMA algorithm. Reception directivity is thus formed.

As described above, the device of the present invention receives signals through a plurality of fixed directivities in a state that the timing of the received signals is not known at the time immediately after the start of receiving such as the time immediately after the turning on of the power source of the device, and the device generates a delay profile by every directivity. Because the device thus detects the reception timing (establishes synchronization) under a state of suppressing interference signals, the device can rapidly detect the reception timing even in a case where there are many interference signals or noises, differently from the conventional method for detecting reception timing where the reception timing and the reception directivity are simultaneously detected.

Furthermore, because the setting of an initial value can be rapidly performed by setting a weighting coefficient corresponding to the directivity at the timing detected immediately after the start of receiving as the initial value of the adaptive array antenna, a reception weighting coefficient of the adaptive array antenna can be calculated more rapidly.

(Embodiment 3)

Next, a description will be given to the operation of a change of a path during the communication of the adaptive array antenna device in the embodiment 1.

Even during the communication, an arriving direction and an arrived time vary owing to the movement of a transmitter side. Even the conventional apparatus can follow slow variations of the arriving direction and the arrived time. However, the conventional apparatus that updates a previous slot weighting coefficient cannot follow the disappearance of an arrived signal and the appearance of a new arrived signal. Hereafter, a method capable of following the disappearance of an arrived signal and the appearance of a new arrived signal will be described.

At first, at the time immediately after the turn on of the power source of the device, as described above, signals are first received through a plurality of fixed directivities, and a delay profile is generated to each directivity, and then a path is selected. After that, a weighting coefficient corresponding to the directivity to which the path has been selected is used as an initial value of the weighting coefficient of the adaptive array antenna.

During the communication, as described about the embodiment 1, a delay profile is generated by every directivity over all directions. Then, the timing and the direction that the delay profiles become the maximum are detected. The timing and the direction are the results of the path search, and they are output to the determination circuit B 127 as the timing of the path of a presently communicating desired station.

At the same time, as described about the embodiment 2, a signal from a desired station is extracted from signals received by the reception RF circuits 104–106, and the power detection circuit 123 detects its power to send the detected result to the delay profile generating circuit 126.

The delay profile generating circuit 126 measures received power at every received time. Then, the delay profile generating circuit 126 extracts a path having a possibility of being the signal of the desired station on the basis of the result of the measurement of power. Thus, it is monitored whether a new arrived signal has appeared or not. The delay profile information (the timing of the symbol discrimination point of a receiver) is output to the determination circuit B 127.

The determination circuit B 127 compares a new path determined by the determination circuit A and the path from the delay profile making up circuit 126. Then, if the arriving directions of the two paths are almost the same and the arrived times of them are also almost the same, the processing about the path until now is continued. On the other hand, if the arriving directions of the two paths are different from each other and the reception power of a new path is larger than that from the delay profile generating circuit 126, the path is changed to the new one. That is, the synchronization is set at the timing detected by the delay profile generating circuit 126, and the path of the timing is traced. Incidentally, in a system where a plurality of paths are combined in conformity with a RAKE combining such as the CDMA receiving system, a path having the minimum power until now is changed with a new path.

Thus, by generating a delay profile by every directivity in the detection of the reception timing, directions from which interference signals arrive is narrowed down, and the interference amounts of the interference signals are suppressed for detecting the reception timing. Consequently, path search can rapidly be performed. Therefore, by continuing detecting paths from all directions even during communicating, the trace of a path of a desired station can be performed even in the case where the disappearance of arriving signals or the appearance of a new arriving signal happen.

Furthermore, by setting the directivity information of a selected path as an initial value of the weighting control circuit, the most suitable weighting coefficient can be calculated rapidly even at the time of changing a path.

The radio reception apparatus and the method for detecting reception timing according to the embodiment can be applied to a base station apparatus performing radio communication with a communication terminal in a digital radio communication system.

Thereby, the reception timing can be detected correctly in a digital radio communication system even at the time of detecting a received signal from all directions such as the time of turning on the power or in case of receiving a signal arrived from a direction different from the receiving directivity during communicating.

The present invention is not restricted to the aforesaid embodiment, and can be implemented with various variations. For example, in the embodiment, the description is given to a case where received signals are isolated to three directivities. However, the received signals may be isolated to two directivities, or four or more directivities.

As described above, a radio reception apparatus and a method for detecting reception timing according to the present invention can suppress interference signals to select the most suitable path by using a plurality of directivities for generating a delay profile by every directivity.

Furthermore, the radio reception apparatus and the method for detecting reception timing according to the present invention can take synchronization at the time of turning on its power source earlier than a conventional adaptive array antenna by combining them with an adaptive array antenna receiver. Moreover, the apparatus and the method can obtain the most suitable weighting coefficient earlier than a conventional adaptive array antenna by using the directivity information of a selected path as an initial value of a weighting control circuit of the adaptive array antenna.

Furthermore, the apparatus and the method can generate delay profiles in a state that the interference signals from all directions are suppressed by combining them with an adaptive array antenna receiver, and thereby the apparatus and the method can select the most suitable path in comparison with paths until now. Moreover, the apparatus and the method can obtain the most suitable weighting coefficient earlier than a conventional adaptive array antenna by using the directivity information of a selected path as an initial value of a weighting control circuit of the adaptive array antenna.

This application is based on the Japanese Patent Application No. HEI 11-115765 filed on Apr. 23, 1999, entire content of which is expressly incorporated by reference herein.

INDUSTRIAL APPLICABILITY

The present invention can be applied to a base station apparatus and a communication terminal in a digital radio communication system.

What is claimed is:

1. A radio reception apparatus comprising:
   a receiver that receives signals in a plurality of fixed directivities;
   a delay-profile generator that generates a delay profile by each of the plurality of fixed directivities concerning a desired signal extracted from the signals;
   a timing detector that detects reception timing of the desired signal on a basis of the delay profile; and
   a directivity former that determines a directivity using the delay profile, wherein:
   after receiving the signals in the plurality of fixed directivities, said receiver receives a signal in the directivity determined in said directivity former.

2. The radio reception apparatus according to claim 1, wherein said apparatus divides all directions into said plurality of fixed directivities.

3. The radio reception apparatus according to claim 1, wherein said receiver comprises an adaptive array antenna.

4. The radio reception apparatus according to claim 1, wherein said apparatus sets a directivity at said reception timing detected by said timing detector as an initial directivity immediately after a start of receiving said signals.

5. A radio reception apparatus comprising:
   a first delay-profile generator that extracts a desired signal by each of signals received in a plurality of fixed directivities to generate a first delay profile by each of the fixed directivities concerning the desired signal;
   a second delay-profile generator that generates a second delay profile concerning the desired signal extracted from signals received in a variable directivity;
   a path selector that selects a most suitable path as to the desired signal from paths as to the desired signal detected by using said first delay profile and said second delay profile respectively; and
   a directivity former that determines a directivity using said first delay profile and said second delay profile, wherein
   after receiving the signals in the plurality of fixed directivities, a receiver receives a signal in the directivity determined in said directivity former.

6. A base station apparatus equipped with a radio reception apparatus, said radio reception apparatus comprising:
   a receiver that receives signals in a plurality of fixed directivities;
   a delay-profile generator that generates a delay profile by each of the plurality of directivities concerning a desired signal extracted from the signals;
   a timing detector that detects reception timing of the desired signal on a basis of the delay profile; and a directivity former that determines a directivity using the delay profile, wherein
after receiving the signals in the plurality of fixed directivities, said receiver receives a signal in the directivity determined in said directivity former.

7. A communication terminal for performing radio communication with a base station apparatus equipped with a radio reception apparatus, said radio reception apparatus comprising:

a receiver that receives signals in a plurality of fixed directivities;

a delay-profile generator that generates a delay profile by each of the plurality of fixed directivities concerning a desired signal extracted from the signals;

a timing detector that detects reception timing of the desired signal on a basis of the delay profile; and a directivity former that determines a directivity using said delay profile, wherein
after receiving the signals in the plurality of fixed directivities, said receiver receives a signal in the directivity determined in said directivity former.

8. A method for detecting reception timing, comprising:

receiving signals in a plurality of fixed directivities being set by dividing all directions;

generating a delay profile by each of the plurality of fixed directivities concerning a desired signal extracted from the signals;

detecting the reception timing of the desired signal on a basis of the delay profile;

determining a directivity using the delay profile; and receiving a signal in the determined directivity.

9. The method according to claim 8, said method further comprising:

setting a directivity at said detected reception timing as an initial directivity immediately after a start of receiving said signals.

10. A method for detecting reception timing, said method comprising the steps of:

extracting a desired signal by each of signals received in a plurality of fixed directivities to generate a first delay profile by each of the fixed directivities concerning the desired signal;

generating a second delay profile concerning the desired signal extracted from signals received through a variable directivity;

selecting a most suitable path as to the desired signal from paths as to the desired signal detected by using said first delay profile and said second delay profile respectively;

determining a directivity using said first delay profile and said second delay profile; and receiving a signal in the determined directivity.

* * * * *